United States Patent
Choudhury et al.

(10) Patent No.: US 11,563,640 B2
(45) Date of Patent: Jan. 24, 2023

(54) NETWORK DATA EXTRACTION PARSER-MODEL IN SDN

(71) Applicant: AT&T Intellectual Property I, L.P., Atlanta, GA (US)

(72) Inventors: Gagan Choudhury, Jacksonville, NJ (US); Simon Tse, Holmdel, NJ (US); Narayan Padi, Cedar Knolls, NJ (US); Alvin Goddard, Kendall Park, NJ (US); Lynn Rivera, Leesburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/219,290

(22) Filed: Dec. 13, 2018

(65) Prior Publication Data

US 2020/0195512 A1    Jun. 18, 2020

(51) Int. Cl.
*H04L 41/12* (2022.01)
*H04L 45/00* (2022.01)
(Continued)

(52) U.S. Cl.
CPC .............. *H04L 41/12* (2013.01); *H04L 41/20* (2013.01); *H04L 43/0811* (2013.01);
(Continued)

(58) Field of Classification Search
CPC ..... H04L 41/20; H04L 41/12; H04L 41/0853; H04L 41/0873; H04L 41/046; H04L 41/0893; H04L 41/22; H04L 41/0816; H04L 41/142; H04L 41/085; H04L 41/0823; H04L 41/147; H04L 41/145; H04L 41/16; H04L 43/0811; H04L 43/065; H04L 43/028; H04L 43/062; H04L 43/0876; H04L 43/12; H04L 43/04; H04L 43/0829; H04L 43/082; H04L 43/18; H04L 43/0817; H04L 45/70; H04L 45/02; H04L 45/64; H04L 45/42; H04L 45/00;
(Continued)

(56) References Cited

U.S. PATENT DOCUMENTS 8,705,741 B2    4/2014 Voruganti et al.
9,208,240 B1 *  12/2015 Anton .................... G06Q 40/08
(Continued)

FOREIGN PATENT DOCUMENTS

CN       103346922 A      10/2013
WO    WO 2015/062295 A1    5/2015
(Continued)

OTHER PUBLICATIONS

Tootoonchian et al.; "On Controller Performance in Software-Defined Networks"; Hot-ICE 12; 2012; 6 pages.
(Continued)

*Primary Examiner* — Un C Cho
*Assistant Examiner* — Rasha K Fayed
(74) *Attorney, Agent, or Firm* — Guntin & Gust, PLC; Robert Gingher

(57) ABSTRACT

A parser model may be used with software-defined applications or controllers. A network topology may be detected and based on the change in the network topology, a network device may filter certain network data traffic for processing by a software-defined network controller.

20 Claims, 6 Drawing Sheets

(51) Int. Cl.
*H04L 9/40* (2022.01)
*H04L 41/00* (2022.01)
*H04L 43/0811* (2022.01)
*H04L 43/028* (2022.01)

(52) U.S. Cl.
CPC .......... *H04L 45/70* (2013.01); *H04L 63/0227* (2013.01); *H04L 43/028* (2013.01)

(58) Field of Classification Search
CPC . H04L 63/0227; H04L 67/10; H04L 67/1097; H04L 67/06; H04L 67/18; H04L 49/25; H04L 12/26; H04L 12/24; H04L 12/947; H04L 12/717; H04L 12/715; H04L 12/801; H04L 12/751; H04L 12/5689; H04L 12/911; H04L 69/329; H04L 47/19; H04L 29/08; H04L 29/06; H04L 61/1511
See application file for complete search history.

(56) References Cited

U.S. PATENT DOCUMENTS

| | | | | |
|---|---|---|---|---|
| 9,264,375 | B2* | 2/2016 | DeCusatis | H04L 41/0806 |
| 9,356,875 | B2 | 5/2016 | Dasgupta et al. | |
| 9,548,874 | B2* | 1/2017 | Joe | H04L 61/1511 |
| 9,577,915 | B2 | 2/2017 | Hui et al. | |
| 9,621,441 | B2* | 4/2017 | Williams | H04L 43/18 |
| 9,621,592 | B2 | 4/2017 | Ashley et al. | |
| 9,780,909 | B2* | 10/2017 | Wood | H04L 41/0896 |
| 9,825,867 | B2* | 11/2017 | Zou | H04L 47/19 |
| 9,953,070 | B1 | 4/2018 | Hankins et al. | |
| 9,985,866 | B1 | 5/2018 | Rajagopal et al. | |
| 10,469,360 | B1* | 11/2019 | Bhat | H04L 45/06 |
| 2005/0036500 | A1* | 2/2005 | Rodeheffer | H04L 12/462 |
| | | | | 370/401 |
| 2006/0197762 | A1* | 9/2006 | Smith | G06T 11/206 |
| | | | | 345/440 |
| 2014/0068061 | A1* | 3/2014 | Stitelman | H04L 47/10 |
| | | | | 709/224 |
| 2014/0164584 | A1* | 6/2014 | Joe | H04L 61/1511 |
| | | | | 709/223 |
| 2014/0193154 | A1* | 7/2014 | Graham | H04K 1/003 |
| | | | | 398/79 |
| 2014/0280829 | A1* | 9/2014 | Kjendal | H04L 43/028 |
| | | | | 709/223 |
| 2014/0280834 | A1* | 9/2014 | Medved | H04L 41/0609 |
| | | | | 709/223 |
| 2014/0280898 | A1* | 9/2014 | Voit | H04W 4/02 |
| | | | | 709/224 |
| 2015/0142936 | A1* | 5/2015 | Srinivas | H04L 41/085 |
| | | | | 709/221 |
| 2015/0333824 | A1* | 11/2015 | Swinkels | H04J 14/0227 |
| | | | | 398/25 |
| 2015/0365537 | A1* | 12/2015 | Kahn | H04M 15/65 |
| | | | | 455/408 |
| 2016/0020998 | A1 | 1/2016 | Bifulco et al. | |
| 2016/0119367 | A1 | 4/2016 | Li et al. | |
| 2016/0182329 | A1* | 6/2016 | Armolavicius | H04L 41/0893 |
| | | | | 370/230 |
| 2016/0254959 | A1* | 9/2016 | Arndt | H04L 41/0896 |
| | | | | 370/235 |
| 2016/0262044 | A1* | 9/2016 | Calin | H04L 45/64 |
| 2016/0285706 | A1* | 9/2016 | Rao | H04L 43/028 |
| 2017/0026244 | A1* | 1/2017 | Kamath | H04L 41/12 |
| 2017/0026273 | A1* | 1/2017 | Yao | H04L 61/103 |
| 2017/0142539 | A1* | 5/2017 | Gallo | G06F 16/29 |
| 2018/0054397 | A1 | 2/2018 | Nanda et al. | |
| 2018/0145899 | A1* | 5/2018 | Rao | H04L 43/028 |
| 2018/0152386 | A1 | 5/2018 | Chen et al. | |
| 2018/0219788 | A1* | 8/2018 | Wackerly | H04L 47/122 |
| 2018/0234178 | A1* | 8/2018 | Lee | H04L 45/62 |
| 2018/0270672 | A1* | 9/2018 | Chan | H04L 41/147 |
| 2018/0314619 | A1* | 11/2018 | Jagadeesan | G06F 11/3692 |
| 2018/0337941 | A1* | 11/2018 | Kraning | H04L 43/16 |
| 2019/0004885 | A1* | 1/2019 | Pelletier | G06F 11/3452 |
| 2019/0281078 | A1* | 9/2019 | Eguiarte Salazar | G06N 20/00 |

FOREIGN PATENT DOCUMENTS

| | | |
|---|---|---|
| WO | WO 2015/074453 A1 | 5/2015 |
| WO | WO 2016/074126 A1 | 5/2016 |
| WO | WO 2018/086569 A1 | 5/2018 |
| WO | WO 2018/125686 A3 | 7/2018 |

OTHER PUBLICATIONS

Khurshid et al.; "VeriFlow: Verifying Network-Wide Invariants in Real Time"; ACM Proceedings of the first workshop on Hot Topics in software defined networks; 2012; p. 15-27.

* cited by examiner

NETWORK DATA EXTRACTION PARSER-MODEL IN SDN

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and network interfaces or network interface cards (NICs). Cloud systems are complex multi-layer hardware and software systems that consist of multiple components, interacting with each other through complicated mechanisms. The operation and management of a large-scale cloud is highly susceptible to anomalies, attacks, and faults. Identifying the root causes is often difficult to diagnose even with the skilled operators.

Conventionally, network data extraction has been done for the entire network and for all parameters even though information is typically needed on a subset of the network and for a few of the parameters. The complete data set is extensive and most of the data is not relevant. In conventional systems, it is a challenge to scale as the network evolves and grows, sometimes even into multiple disjoint networks (e.g., metro networks).

This disclosure is directed to addressing issues in the existing technology.

SUMMARY

Disclosed herein are methods, systems, or apparatus associated with network data extraction parsing (e.g., filtering). The steps may include receiving parameters for the a network filter, wherein the parameters can be associated with PCEP, BGPLS, telemetry, or other network data; obtaining data from the network; filtering data based on the parameters; or transmitting the filtered data to an SDN application associated with a SDN controller.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein is a framework that implements a parser model for SDN applications or controllers. Different SDN applications may use this model and configure to the application specific needs. Generally, this framework may allow the network data acquisition to happen in only seconds and thus enable real-time SDN based centralized applications. For example, dynamic parsing (e.g., filtering) may be based on changing network topology resulting from increased network virtualization. A required relevant dataset may be filtered based on only the necessary part of the topology (e.g., particular physical or virtual network devices) or the relevant network metrics (e.g., telemetry, BGPLS, or PCEP parameters).

Parsing operations may be done separately and exclusively for each subnetwork or even at device level depending upon the situation. Conventionally, each of these steps may take several minutes even at an individual level. In order to get a centralized view, in conventional configuration, it may be minutes to tens of minutes) far from real time. This may result in delayed data processing that is not usable for real time SDN applications.

Figure 1:
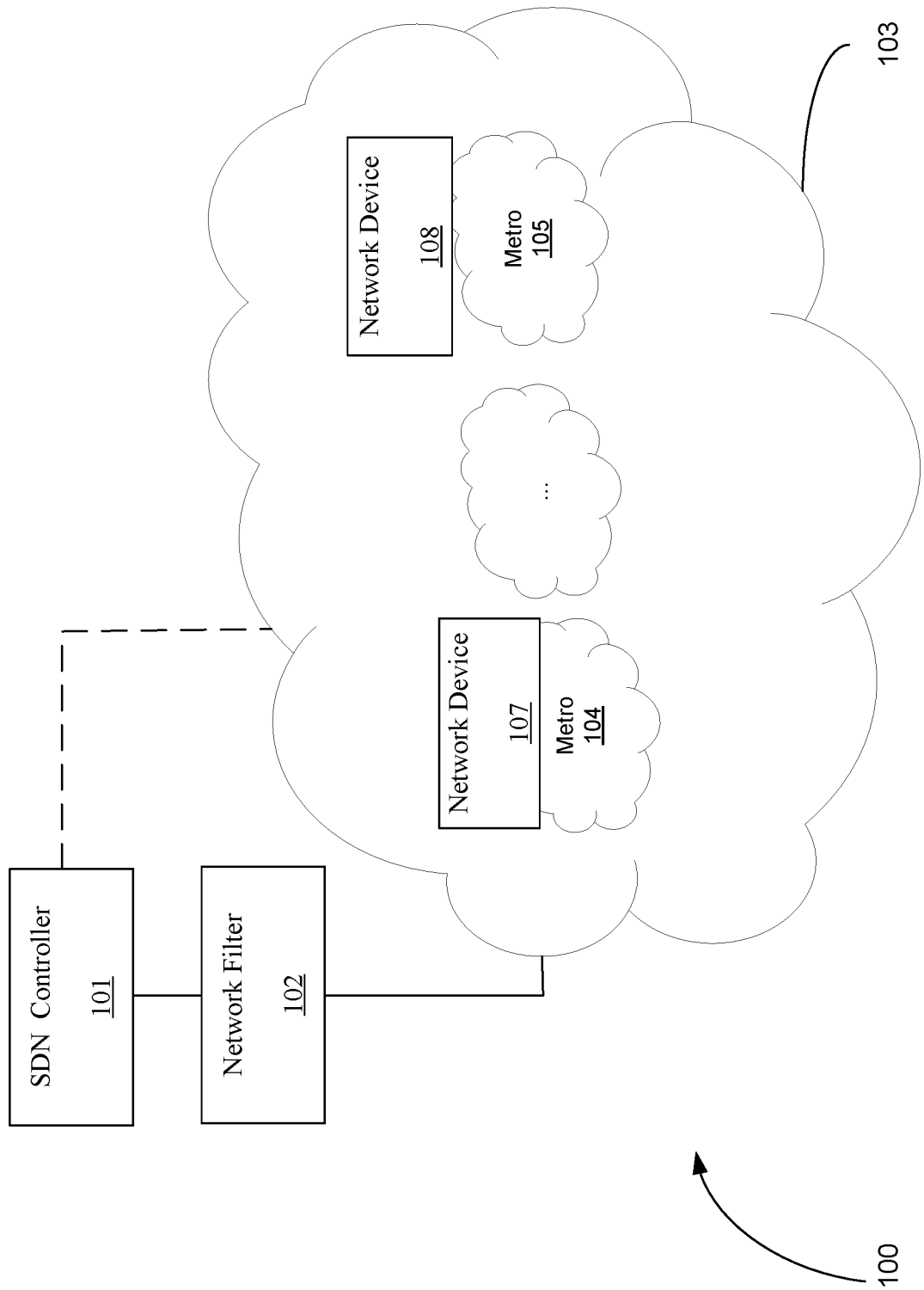
FIG. 1 illustrates an exemplary system that may be used for network data extraction parsing for SDNs.

FIG. 1 illustrates an exemplary system that may be used for network data parsing as disclosed herein. System 100 may include network 103 that may include multiple network devices, such as network device 107 or network device 108. The network device may be a router, server, SDN controller, or switch, among other things. Network 103 may also include other networks, such as metropolitan (e.g., metro) network 104 or metro network 105, which may include their own network devices. A metro network may connect the central offices (CO) in a metro area and serves as an aggregation network between the access networks and the wide area network. SDN controller 101 (there may be multiple SDN controllers in each network) may be communicatively connected with filter 102 as well as network device 107 and network device 108. Filter 102 may be a separate apparatus that may be integrated into SDN controller 101, may be within a separate network device, or may be distributed throughout system 100 (e.g., within network device 107 or network device 108). There may be a plurality of filters 102 that may be used for each network or each network application.

In a first example, network 103 (e.g., a core packet network) may include SDN controller 101 that is BGP peered to one or more core routers of the core packet network to obtain information associated with a topology of a network. SDN controller 101 may receive the information associated with a topology, although an SDN application of SDN controller 101 may need only information associated with a certain area or region of that topology. In addition, SDN controller 101 may be path computation element protocol (PCEP) peered to the routers in network 103 and SDN controller 101 may have the capability to receive the tunnel or routing data from the routers. The aforementioned tunnel or routing data from the routers is typically a large amount. Filter 102 may be applied, in this example, in the following way: a) to identify area-0 part of the topology; or b) recursively apply the disclosed model for filter 102 to obtain the tunnels that use the identified area-0 topology. There may be a lot of information sent to SDN controller 101, but filter 102 may choose only relevant information to be passed to the SDN application to process. From across several attributes that are available, the disclosed model may choose only the relevant attributes.

A second example may refer to metro packet networks (e.g., metro network 104). SDN controller 101 may be responsible for applications across multiple areas, for example, one or more metro areas (e.g., metro network 104 or metro network 105). Hence, SDN controller 101 may be BGP-LS peered to several routers (VPLS-PE/Aggregation router, etc.) which may relay the corresponding topologies. Mechanisms like RPC, MQTT, etc. may stream the device telemetry (e.g., telemetry of routers in this case, but could be other devices) and SDN controller 101may consume this telemetry information. This telemetry data is usually very large and in pre-SDN environment, may take hours or days to perform analytics on it. The filter 102 model may a) identify what area is targeted; b) obtain the relevant topology from BGP-LS; c) extract the points belonging to the topology identified in "b)" from the telemetry stream; or d) extract only the sensors or metrics relevant to that application (depending on application, such as detecting link instability). The disclosed filter 102 model may just process the telemetry information belonging to the sensors. Having the targeted relevant network data in real-time, SDN applications may analyze, detect, and resolve network issues in real-time. Telemetry information may include metrics associated with interface (e.g., up/down, ingress bytes, egress bytes, etc. for interface, et al.), optics, link aggregation control protocol (LACP), etc.).

Figure 2:
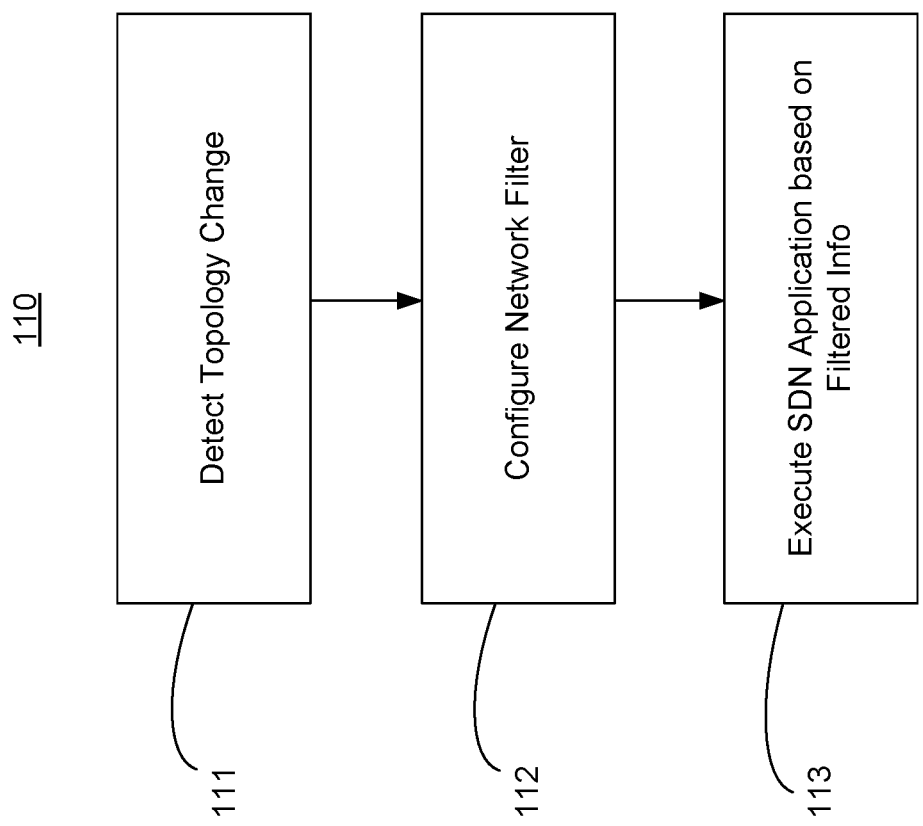
FIG. 2 illustrates an exemplary method for network data extraction parsing for SDN.

FIG. 2 illustrates an exemplary method 110 for efficient network data extraction for SDN. At step 111, filter 102 may obtain an indication of a change in the topology of network 103 (e.g., an addition of network device 107) or an indication of a change in the target application. This change may be detected based on network device 107 or another device broadcasting or otherwise sending an alert. The alert may be a general routing update.

At step 112, based on the indication of the change in topology, filter 102 may send a request to network devices of network 103 (e.g., network device 107 or network device 108) to filter their alerts to only send certain parameters subsequent to this topology change. BGPLS, PCEP, Telemetry, etc. include an exhaustive list of parameters; however, filter 102 may choose only certain needed parameters (also referred to elements herein). With reference to the first example above, for core packet network traffic engineering (TE) application, the model picks from a) BGPLS: link utilizations by priorities, link states, capacity, cost, etc. or b) PCEP: ERO (Explicit Route Object) and RRO (Record Route Object) paths, tunnel details, and only the tunnels passing over valid area-0 links identified in BGPLS, etc. With reference to the second example above, for metro network with link instability scenario, although the focus is in a different area of the network, part of BGPLS elements are similar to core network, however now different area. In this case, the model may extract from telemetry (e.g., ingress, egress octets per interface, carrier transition, transmit-receive power levels, temperature, etc.). The parameters may be generally associated with BGPLS, PCEP, or telemetry.

Alternatively, at step 112, based on the detected change in topology, filter 102 may filter using the aforementioned parameters, but not send any filtering requests to network devices. The network devices may broadcast (or otherwise send) information as usual, but filter 102 may filter the appropriate information and send to SDN controller 101.

Note, at step 112, there may be a third option in which there is a combination of step 112, with regard to sending and not sending filtering requests.

At step 113, SDN controller 101 may use the received information associated with step 112 to execute an SDN application. As mentioned in two examples above, in the first example (core network TE application) there may be an extraction of only elements related to Traffic Engineering, all other information may be important but not relevant to the analysis by a routing optimization algorithm (e.g., an SDN application). Similarly in the second example (metro network link instability application) there may be an extraction of additional sensor information from telemetry such that a SDN application may 1) detect current and potential flapping bundles, 2) analyze the impact on the network when the link cost changes are applied to suspend such bundles from carrying live traffic, or 3) push (e.g., broadcast) the configuration changes to the network to correct a network issue. Note bundle or link is a combination of circuits. Let's say there may be a few 100 g circuits between the same headend and tail end devices, all of which may be tied together into one and treated as one bundle (e.g., link).

With increasing demand for networks to be SDN enabled, it is important for the controller to extract the live network data quickly. The time for extraction of the network data may be directly proportional to the size of the network. Fast data extraction is significant for the SDN controller to make real-time network traffic management decision in a timely manner. Slow data extraction would reduce the effectiveness of certain SDN applications.

The core of the network, which is usually complex, might comprise of several subnetworks each of which may have their own disjointed or nearly disjointed topologies. Certain ODL (OpenDaylight) protocols such as PCEP and BGPLS exposes the network control plane data. This data is quite voluminous. SDN applications targeting such networks may need the following steps to happen in near real-time: a) getting the entire set of SDN application associated data, b) doing algorithmic analysis, c) making decisions, and d) pushing the changes on to the network. With the conventional solutions, such extraction and gathering of the targeted network data for analysis runs into several minutes at the best to hours or days at the worst, because of data processing. Additionally, when the network control plane data is not directly available, the collection mechanisms lean on streaming telemetry from each device and assimilate the data into huge data warehouses for analysis. Since there may be a large number of devices and a large amount of metrics for data collection, the assimilation may be tedious and very time consuming. Such resource intensive extractions and assimilation may not only cause delay in extraction, but also delays analysis. Such delays may not serve the purpose of SDN applications that are more effective with near real-time network data to make and push near real-time changes.

The network data extraction parser disclosed herein may provide for the following. In a first step, the network data extraction parser system may apply dynamic topology filtering of the network in support of the SDN application targeting only the network or subnetwork the application is designed for. In a second step, the network data extraction parser system may apply dynamic metrics filter that extracts only the metrics relevant to the SDN application and network and only for the network components of the already filtered topology. Taking the example core of the network and the associated SDN application to perform traffic engineering, this mechanism filters on and focuses only on the core topology and only certain metrics/elements of the protocol data of BGPLS, PCEP, etc. In the example of a sub-network or a metro, this mechanism may focus only on individual metro network topology and extract the corresponding metrics using telemetry collection mechanisms, using GRPC, MQTT, etc., in which these technologies may be used to extract data. With this mechanism, the extraction time may be reduced to seconds as opposed to several minutes or even hours.

This highly efficient data acquisition provides the ability for real time data-driven applications to be able to perform network operations dynamically and efficiently to meet the most current/recent network needs. Any delay or staleness may defeat the purpose of real time and automated network management. This approach allows for the combining of centralized traffic engineering with router-based distributed traffic engineering. With inefficient data acquisition, the centralized traffic engineering may be slower than the router-based distributed traffic engineering and was not as useful since by the time a decision was made by the centralized traffic engineering (TE) the data may already be stale. With a much faster data extraction, centralized TE may became almost as fast as the distributed TE or even faster and the decisions may be more useful and faster than the decision made by the distributed TE.

Figure 3:
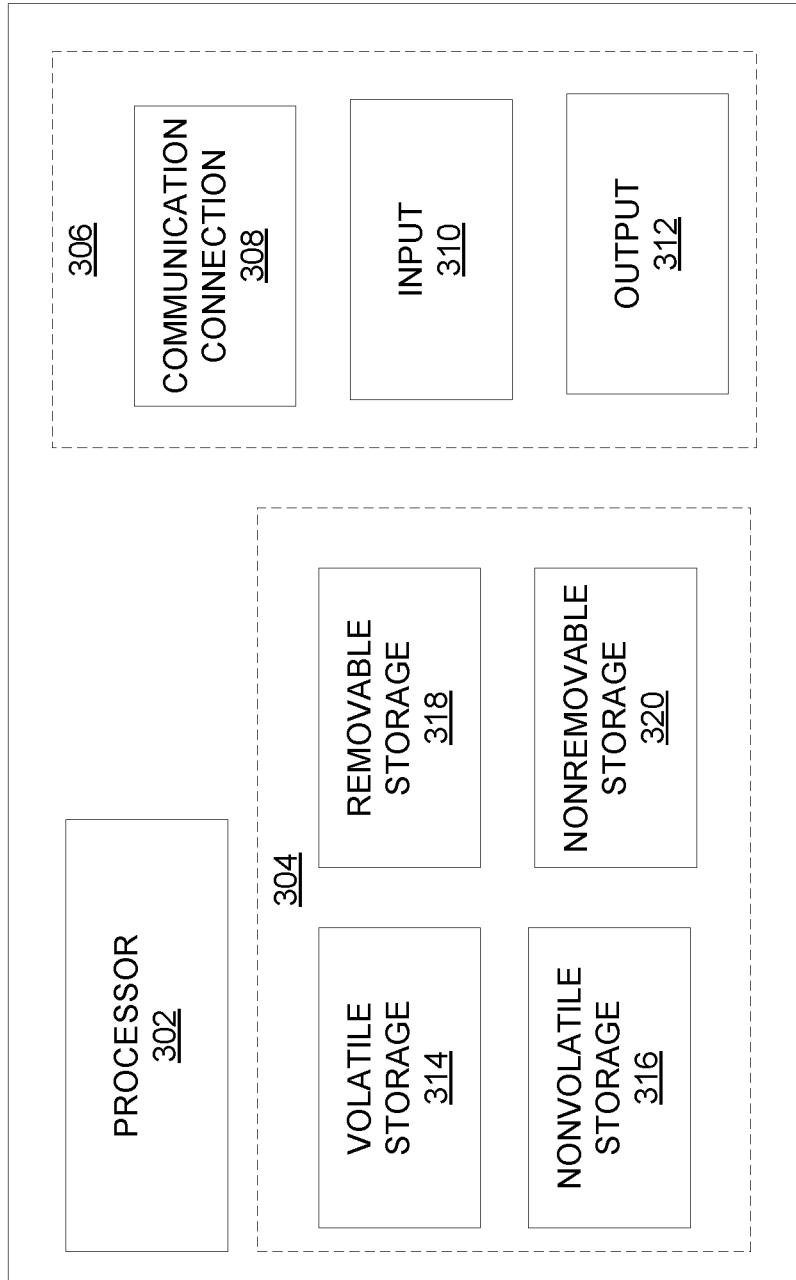
FIG. 3 illustrates a schematic of an exemplary network device.

FIG. 3 is a block diagram of network device 300 that may be connected to or comprise a component of FIG. 1 (e.g., network device 107). Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
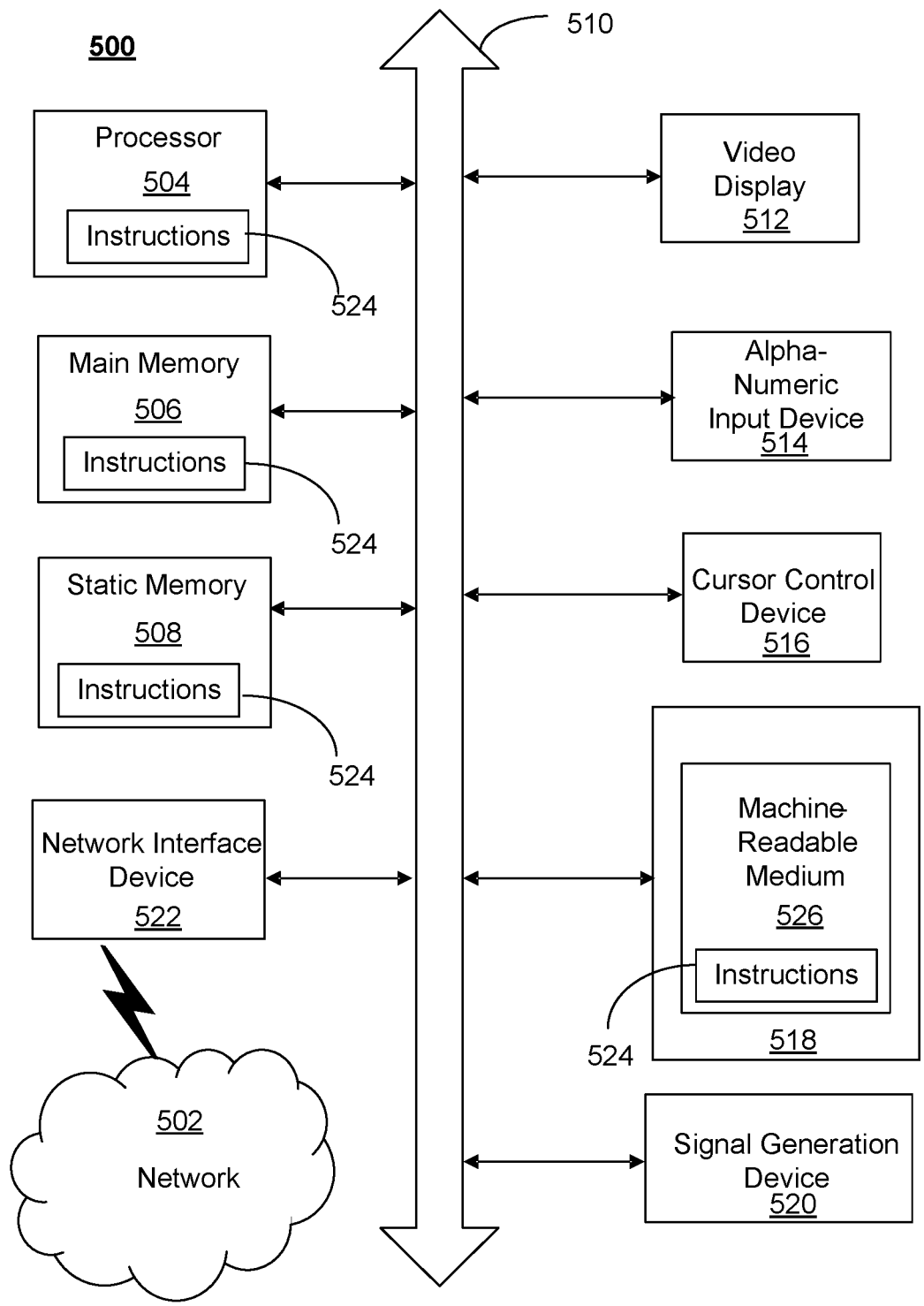
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, network device 106, network device 107, filter 102, SDN controller 101, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 526 on which is stored one or more sets of instructions (e.g., software 524) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 5A:
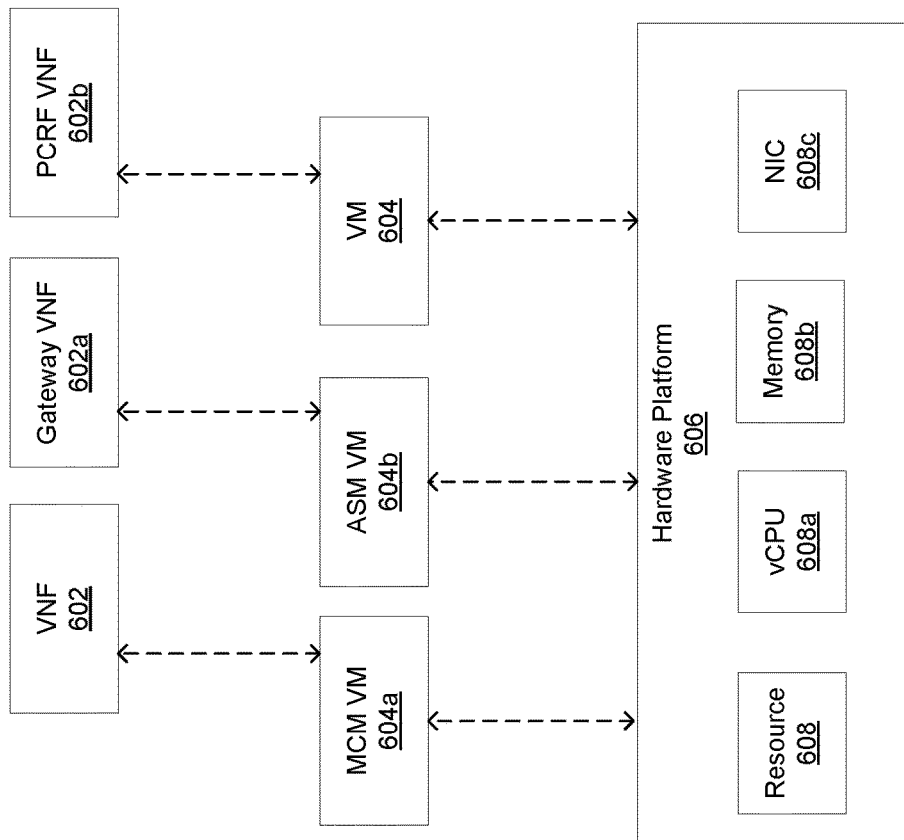
FIG. 5A is a representation of an exemplary network.

FIG. 5*a* is a representation of an exemplary network 600. Network 600 (e.g., network 103) may comprise an SDN for example, network 600 may include one or more virtualized functions implemented on general purpose hardware, such as in lieu of having dedicated hardware for every network function. For example, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 5*a* illustrates a gateway VNF 602*a* and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 5*a* illustrates a management control module (MCM) VM 604*a*, an advanced services module (ASM) VM 604*b*, and a DEP VM 604*c*. Additionally or alternatively, VMs 604 may include other types of VMs. Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 5B:
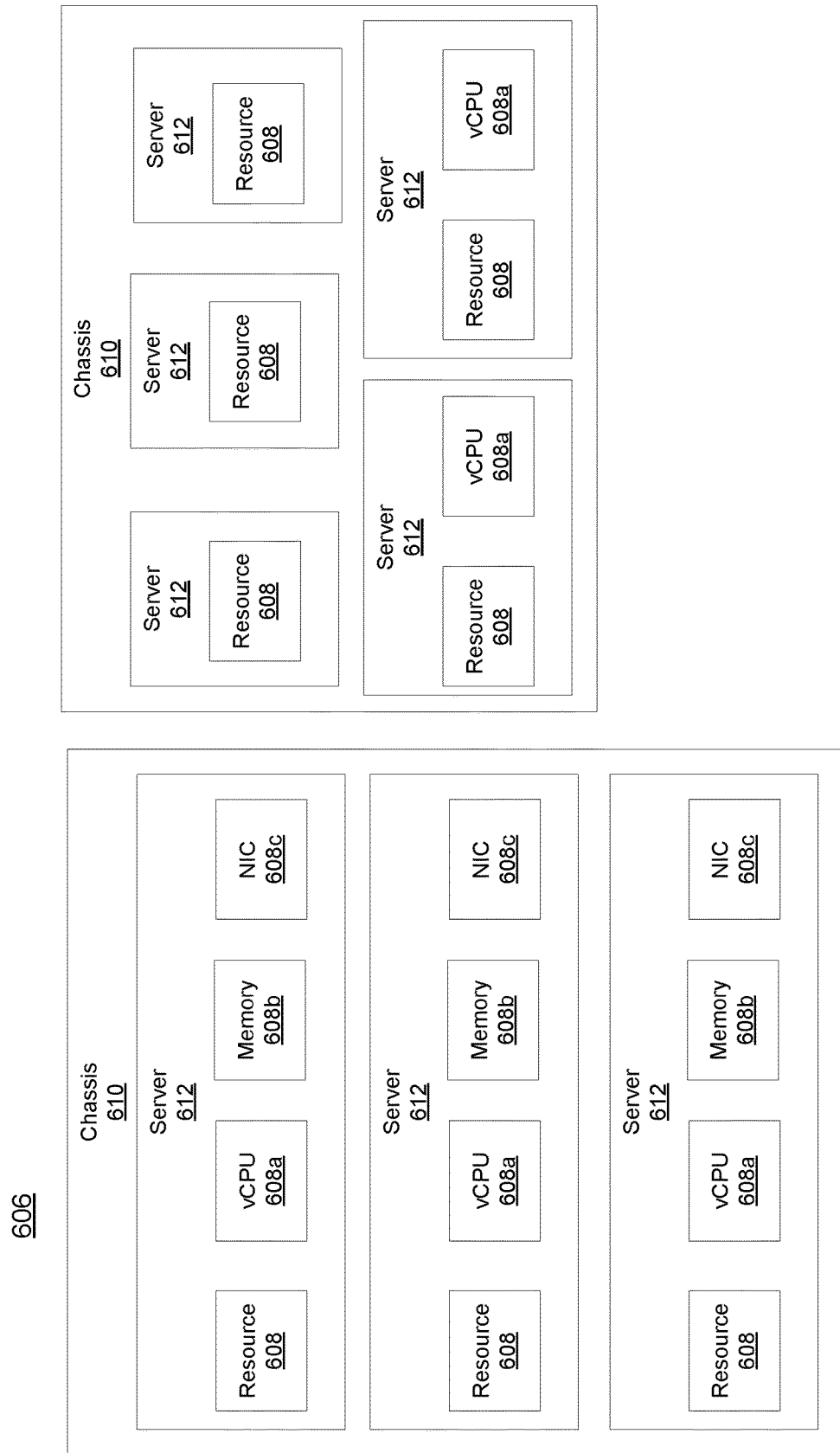
FIG. 5B is a representation of an exemplary hardware platform for a network.

While FIG. 5*a* illustrates resources 608 as collectively contained in hardware platform 606, the configuration of hardware platform 606 may isolate, for example, certain memory 608*c* from other memory 608*c*. FIG. 5*b* provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 5*b* illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (e.g., consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which alerts associated with the network data extraction parser system disclosed herein may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—network data extraction parser system—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Disclosed herein are methods, systems, or apparatus associated with network data extraction parsing. The steps may include receiving parameters for the a network filter, wherein the parameters can be associated with PCEP, BGPLS, telemetry, or other network data stuff; obtaining data from the network; filtering the data based on the parameters; or passing the filtered data to the SDN application, wherein the SDN controller controls the network, wherein the model has the capability to manage the network in a real-time and dynamic way. Telemetry data, PCEP data, BGPLS data, and other network data disclosed herein may be considered different sets of network data that floods in and clogs up the pipe (if not filtered). Telemetry data may include one or more of the following information associated with a telecommunications network: specific network metrics, time synchronization, local device traffic statistics, system status information, Syslog, SNMP, ACL Logging, accounting, archive configuration change logger, packet capture, interface type, status, speed and duplex, encapsulation, errors on the interface, the last time a network device interface bounced, last time the network device or interface error counters reset, utilization of the network device components (e.g., CPU, interface bandwidth), IP addresses configured on a network device, subnet mask, and MAC address configured on the network device, GPS location of a network device, or facility location of a network device, among other things. The aforementioned may apply to a network device or interface unless otherwise specified.

With regards to filtering the data based on the parameters, the filter should be intelligent in a way that is able to determine what data is suitable for the implemented model. The filter may be located on one or more SDN controllers based on the targeted use of the particular SDN application, which may or may not reside on the SDN controller. Therefore, the "core" controller may be different from the "metro" controller. The filter configuration may be distributed across network devices (e.g., SDN controllers) based on such things as which filter receives more of a certain type of telemetry, BGPLS, or other data. If a first SDN controller receives more telemetry data 1 and a second controller receives more telemetry data 2, among other factors, then the second controller may be configured to filter telemetry data 2 and there may be no instructions to filter telemetry data 1. There may be multiple factors that help decide what parameters (and when) are being filtered. The topology at the time is 'A'. For example, if a new network element is added then the filter will take that into account to increase or decrease the metrics filtered out. There may be an increase in the number of network devices (or network traffic) and therefore the filter may increase the type of data that is filtered out (e.g., decrease the filtered parameters from 10 to 5) or change the type of traffic that is filtered and ultimately used by an SDN application. Alternatively, there may be an increase in the number of network devices (or network traffic) and therefore the filter may decrease the type of data that is filtered out (e.g., increase the filtered parameters from 10 to 12). The aforementioned decrease or increase of filtering may be based on CPU utilization of network devices, bandwidth utilization, packet round-trip delay, or amount of virtual networks, among other things. Note that virtual devices as well as physical device additions or reductions are contemplated herein as factors or parameters. There may be different models within the SDN controller. Therefore, the model may be associated with 1) how to route the traffic, 2) how to expand the network, 3) how to manage the network, etc. Model as disclosed herein may be considered as a way to implement a method.

Methods, systems, and apparatuses (e.g., devices) herein may provide for detecting a change in a network topology; determining the type of change in the network topology; based on a change or the type of change in network topology, determining a parameter for a network filter, wherein the parameter comprises at least a telemetry, PCEP, or BGPLS parameter; based on reaching a threshold amount of the parameter from a network device, configuring the network filter to filter out data associated with the parameter or otherwise configure the network filter based on the parameter to create filtered data; and sending the filtered data to the SDN application. The network filter may be virtual machine. The SDN controller may control one or more networks and the SDN application may be executed or otherwise operated by the SDN controller. The filter may be configured to optimize the amount of processing (e.g., reduce CPU or bandwidth utilization) by the SDN controller or other network devices. The type of change in the network topology may be associated with reaching threshold amounts of telemetry, BGPLS, PCEP, or other parameters, as well as what network devices (e.g., virtual or physical switch, router, SDN controller, or firewall) are added or removed from a network.

What is claimed:

1. A non-transitory, computer-readable storage medium storing computer executable instructions that when executed by a computing device cause said computing device to effectuate operations comprising:
   determining that a new software defined network (SDN) application of a plurality of applications is associated with a first network of a plurality of networks;
   responsive to determining that the new SDN application is associated with the first network, obtaining, during a first period, a plurality of parameters associated with the new SDN application associated with the first network;
   detecting, during a second period, a change in a topology of the first network, wherein the change in topology is due to the new SDN application, wherein the second period is subsequent to the first period, wherein the change in the topology of the first network comprises addition of a network device;
   based on the change in the topology of the first network, determining a subset of parameters of the plurality of parameters for use by a network filter, wherein the network filter first filters network control plane data associated with network elements that are not associated with the change in the topology to derive filtered network control plane data, wherein the subset of the parameters comprises at least a telemetry parameter;
   performing a first filtering of the filtered network control plane data using the subset of the parameters to create a subset of the filtered network control plane data;
   transmitting the subset of the filtered network control plane data to the new SDN application;
   detecting an increase in a number of devices in the first network based on the addition of the network device;
   based on the increase in the number of the devices in the first network, decreasing a number of the parameters in the subset of the parameters, wherein the decreasing the number of the parameters in the subset of the parameters comprises removing a GPS location of the network device or facility location of the network device from the subset of the parameters to create a reduced subset of the parameters;
   performing a second filtering of the filtered network control plane data using the reduced subset of the parameters to create an increased subset of the filtered network control plane data, the second filtering being performed after the decreasing of the number of the parameters, the detecting of the increase in the number of the devices, and the first filtering; and
   transmitting the increased subset of the filtered network control plane data to the new SDN application.

2. The non-transitory, computer-readable storage medium of claim 1, wherein the determining the subset of parameters for the network filter is further based on a type of virtual device added or removed from the first network.

3. The non-transitory, computer-readable storage medium of claim 1, wherein the new SDN application is associated with detecting link instability in the first network.

4. The non-transitory, computer-readable storage medium of claim 1, wherein the telemetry parameter comprises central processing unit utilization of a second network device communicatively connected with the network device.

5. The non-transitory, computer-readable storage medium of claim 1, wherein the telemetry parameter comprises an interface utilization of a second network device communicatively connected with the network device.

6. The non-transitory, computer-readable storage medium of claim 1, wherein the determining the subset of parameters for the network filter is further based on packet round-trip delay or amount of virtual networks.

7. The non-transitory, computer-readable storage medium of claim 1, wherein the telemetry parameter comprises a number of errors on an interface of the network device.

8. An apparatus comprising:
   a processor; and
   a memory coupled with the processor, the memory storing executable instructions that when executed by the processor cause the processor to effectuate operations comprising:
      determining that a new software defined network (SDN) application of a plurality of applications is associated with a first network of a plurality of networks;
      responsive to determining that the new SDN application is associated with the first network, obtaining, during a first period, a plurality of parameters associated with the new SDN application associated with the first network;
      detecting, during a second period, a change in a topology of the first network, wherein the change in topology is due to the new SDN application, wherein the second period is subsequent to the first period, wherein the change in the topology of the first network comprises addition of a network device;
      based on the change in the topology of the first network, determining a subset of parameters of the plurality of parameters for use by a network filter, wherein the network filter first filters network control plane data associated network elements that are not associated with the change in the topology to derive filtered network control plane data, wherein the subset of the parameters comprises at least a telemetry parameter;

filtering the filtered network control plane data using the subset of the parameters to create a subset of the filtered network control plane data;
detecting an increase in a number of devices in the first network based on the addition of the network device;
based on the increase in the number of the devices in the network, decreasing a number of the parameters in the subset of the parameters, wherein the decreasing the number of the parameters in the subset of the parameters comprises removing a GPS location of the network device or syslog associated with the network device from the subset of the parameters to create a reduced subset of the parameters;
filtering the filtered network control plane data using the reduced subset of the parameters to create an increased subset of the filtered network control plane data; and
transmitting the increased subset of the filtered network control plane data to the new SDN application.

9. The apparatus of claim 8 wherein the determining the subset of parameters is further based on a type of virtual device added or removed from the first network.

10. The apparatus of claim 8, wherein the change in the topology of the first network comprises addition of a second network device.

11. The apparatus of claim 8, wherein the telemetry parameter comprises central processing unit utilization of a second network device communicatively connected with the network device.

12. The apparatus of claim 8, wherein the telemetry parameter comprises an interface utilization of a second network device communicatively connected with the network device.

13. The apparatus of claim 8, wherein the determining of the subset of parameters is further based on a location of an added or removed network device.

14. The apparatus of claim 8, wherein the new SDN application is associated with detecting link instability in the first network.

15. A method comprising:
determining that a new software defined network (SDN) application of a plurality of applications is associated with a network of a plurality of networks;
based on the determining that the new SDN application is used in association with the network, obtaining, during a first period, a plurality of parameters associated with the new SDN application that is used in association with the network;
detecting, during a second period, a change in a topology of the network, wherein the change in topology is due to the new SDN application, wherein the second period is subsequent to the first period, wherein the change in the topology of the network comprises addition of a network device;
based on the change in the topology of the network, determining a subset of parameters of the plurality of parameters for removal by a network filter, wherein the network filter first filters out network control plane data associated with network elements that are not associated with the change in the topology to derive filtered network control plane data, wherein the subset of the parameters comprises at least a telemetry parameter;
filtering the filtered network control plane data for the new SDN application using the subset of the parameters and the filtered network control plane data;
detecting an increase in a number of devices in the network based on the addition of the network device;
based on the increase in the number of the devices in the network, decreasing a number of the parameters in the subset of the parameters, wherein the decreasing the number of the parameters in the subset of the parameters comprises removing a GPS location of the network device or error information associated with the network device from the subset of the parameters to create a reduced subset of the parameters;
filtering the filtered network control plane data using the reduced subset of the parameters to create an increased subset of the filtered network control plane data; and
transmitting the increased subset of the filtered network control plane data to the new SDN application.

16. The method of claim 15, wherein the determining of the subset of parameters for the network filter is further based on a type of virtual device added or removed from the network.

17. The method of claim 15, wherein the change in the topology of the network comprises addition of a second network device.

18. The method of claim 15, wherein the telemetry parameter comprises central processing unit utilization of a second network device communicatively connected with the network device.

19. The method of claim 15, wherein the telemetry parameter comprises an interface utilization of a second network device communicatively connected with the network device.

20. The method of claim 15, further comprising distributing a filter configuration across the network devices based on a filter associated with the filter configuration receiving more of a certain type of telemetry, border gateway protocol link state, or other network control plane data.

* * * * *